United States Patent [19]

Shirley

[11] 4,263,866
[45] Apr. 28, 1981

[54] SKI BOAT

[75] Inventor: Robert L. Shirley, Maryville, Tenn.

[73] Assignee: Master Craft Boat Company, Maryville, Tenn.

[21] Appl. No.: 13,618

[22] Filed: Feb. 21, 1979

Related U.S. Application Data

[63] Continuation of Ser. No. 824,968, Aug. 15, 1977, abandoned.

[51] Int. Cl.³ .............................................. B63B 1/18
[52] U.S. Cl. ...................................... 114/271; 114/56
[58] Field of Search ..................... 114/56 X, 288, 290, 114/291, 271; 9/6

[56] References Cited

U.S. PATENT DOCUMENTS

| | | | |
|---|---|---|---|
| 3,137,261 | 6/1964 | Noe | 114/290 |
| 3,303,809 | 2/1967 | Ross | 114/56 |
| 3,709,178 | 1/1973 | Piker et al. | 114/56 |

*Primary Examiner*—Sherman D. Basinger
*Attorney, Agent, or Firm*—Luedeka & Fitch

[57] ABSTRACT

An elongated ski boat is provided for producing a relatively small, well-defined wake and a relatively smooth working table. The boat comprises an elongated hull which includes a bow, a stern, a port side, a starboard side and a transom. The hull comprises a starboard keel panel and a port keel panel, each of which extends from a location above the water line near the bow to the stern of the hull. The keel panels join one another at a center keel line to form a V-shaped keel section having a starboard edge and a port edge. The V-shaped keel section defines an obtuse angle at the bow which progressively increases to an angle of slightly less than 180° at the stern. A starboard chine panel and a port chine panel are each joined to the respective edge of the keel section, extending forwardly from the stern to a location above the water line near the bow. Each of the chine panels extends downwardly from the line of connection with the associated keel panel at an acute angle with the horizontal which angle progressively decreases to about 0° at the stern. A starboard side panel and a port side panel connect to the associated chine panels and extend upwardly and outwardly. The transom attaches to the starboard and port keel panels, chine panels and side panels at the stern of the hull.

4 Claims, 9 Drawing Figures

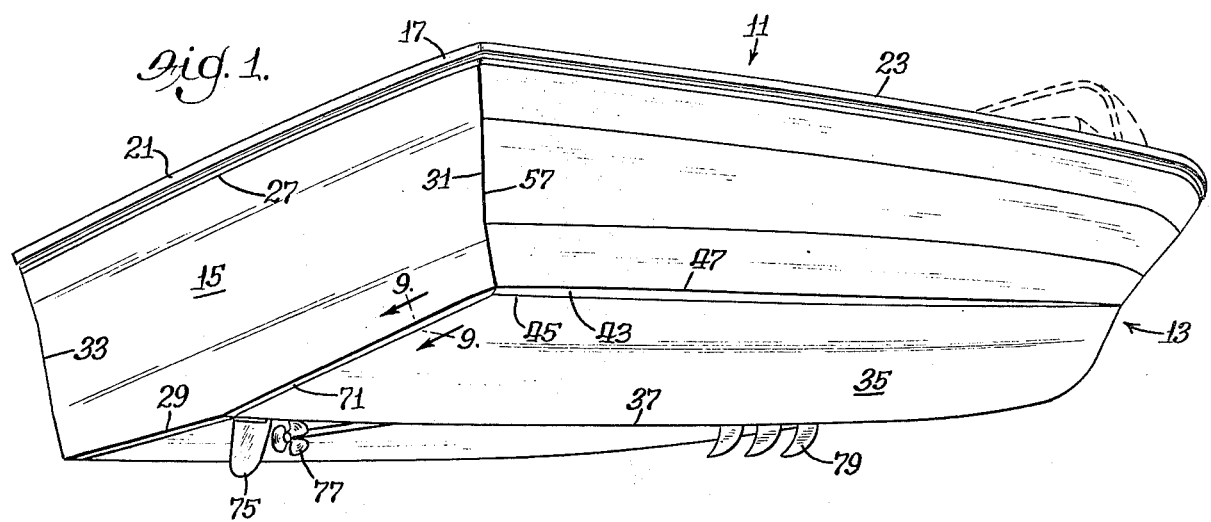
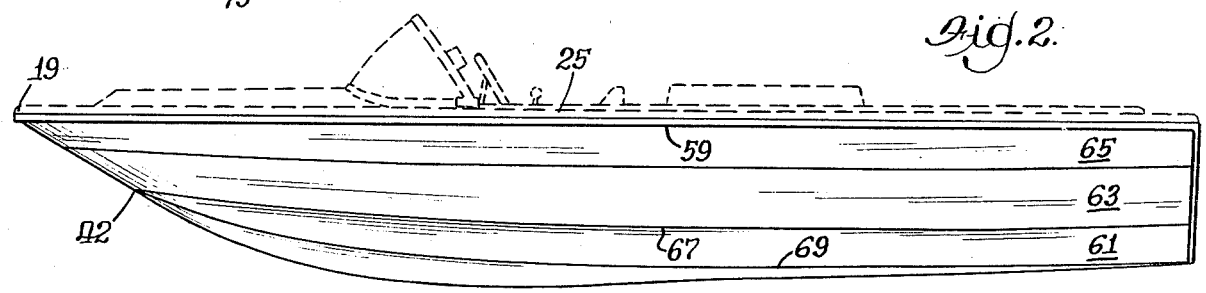
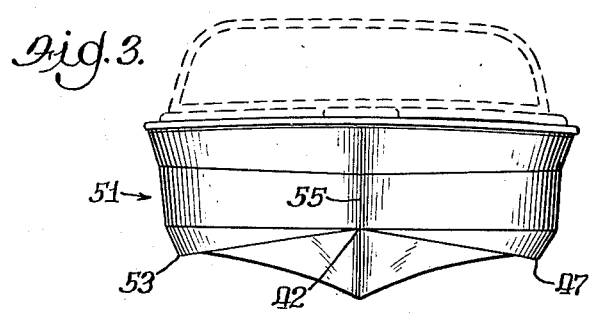
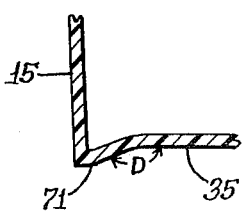
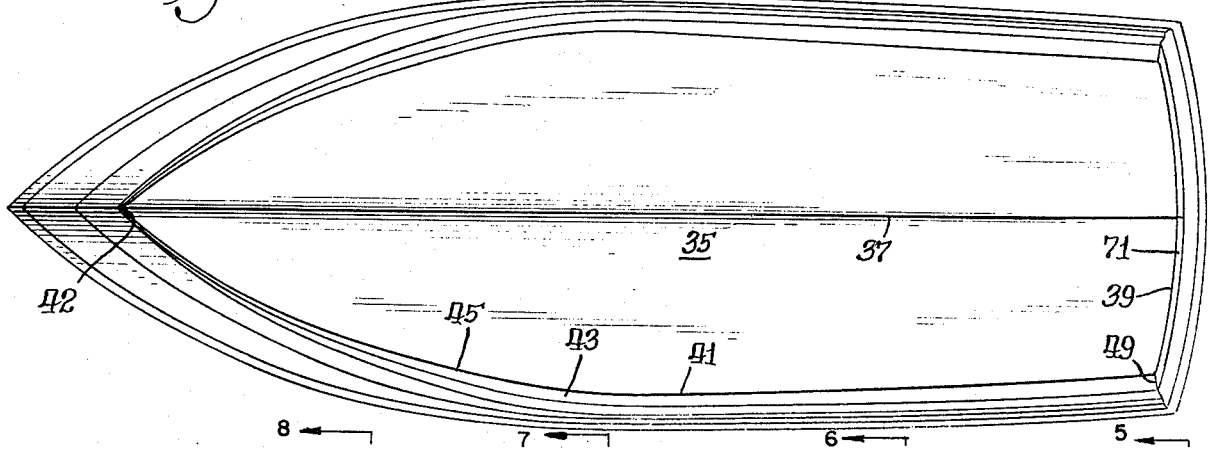

SKI BOAT

This is a continuation of application Ser. No. 824,968, filed Aug. 15, 1977 which has been abandoned.

The present invention relates generally to the field of power boats and particularly to boats used to tow water skiers.

As a boat is propelled through the water, water is pushed aside, thus forming outwardly spreading waves and turbulence behind the boat, called a wake. In the case of a power boat, a significant amount of turbulence develops in the area of water behind the boat.

In the sport of water skiing, power boats are employed to tow a skier over the water while he performs various stunts and maneuvers. Skiers prefer smooth water for the greater ease it provides, as well as the increased safety. For water skiing a desirable wake is one which includes a pair of primary waves which extend from the stern of the boat in a V-shaped pattern. Most water skiing is performed within the wake, i.e. between the primary waves, where the water is generally smoother than the water outside the wake. This general area is known as the "working table". In addition, skiers sometimes jump over the primary waves to ski outside of the wake. Occasionally, stunts are performed as the wake is crossed because the primary waves provide inclined "take-off" surfaces.

For the purposes of the typical "week-end" water skier, known boat hulls provide a reasonably satisfactory wake and water surface behind the boat because the stunts and maneuvers he performs are not particularly difficult nor is the form of execution important. However, to the highly skilled professional or competitive water skier, the wake and water surface behind the boat are quite important. Small amounts of turbulence and secondary waves can seriously affect the skier's timing or throw him off balance in the course of a difficult stunt, such as by catching an edge of a ski. Also, during competition and trick skiing, skiers are frequently required to cross the wake, and it becomes important that the wake is uniform and well defined.

Prior art boat hulls produce primary waves which are large and quite steep as well as secondary waves and excessive turbulence. Such a wake becomes an obstacle to the skier rather than a tool. For trick skiing a preferred wake includes primary waves which are relatively small (about 20 inches in height) and well defined, forming an angle of about 20° with the horizontal on the inside of the wave (the side towards the line of passage of the boat) and about 30° with the horizontal on the outside. The particular angles of the wave are important because such a wake provides a superior take-off surface for stunts like somersaults. In the high speed events, such as slalom and jumping, the smallest wake achievable is preferred in order to ensure that the events are as safe as possible. In addition to the size and condition of the primary waves it is desirable to minimize the formation of secondary waves caused by the passage of the boat as well as the production of undue turbulence in the water in the area between the primary waves. Under these conditions the working table is substantially flat except for the two primary waves and produces relatively uniform resistance to the skier because the density of the surface is relatively uniform since a minimum of air is present in the water surface.

Heretofore, it has been generally known that the size and shape of the hull affects the size and character of the wake a particular boat produces. It has also been known that the depth to which the hull extends when it moves and the volume of water displaced affect the size and character of the wake. For example, when a boat planes, the waves produced are generally smaller than at non-planing speeds. The height of the waves can thus be diminished by raising the boat higher out of the water. This can be accomplished by widening the boat, simultaneously widening the wake, which is an unsatisfactory result. The displacement is commonly reduced by increasing the planing effect. However, this solution generally increases the turbulence within the wake because air is pressurized and mixed with the water to provide the increased lift. The boat also becomes difficult to maneuver precisely, particularly when a skier swings from side to side on a tow rope. Moreover, it is also extremely difficult to select or adjust these parameters to produce the desired wake size and character for trick skiing at relatively slow speeds of about 18 mph and a satisfactory wake at faster speeds of about 35 mph which are employed for slalom skiing and jumping.

It is therefore an object of the present invention to provide a boat hull which produces a well-defined wake having primary waves with an inside angle of about 20° with the horizontal and an outside angle of about 30° as the hull is propelled through the water at about 18 mph with a minimization of secondary waves. It is also an object to provide a boat hull which produces a smooth water surface behind the boat and within the wake as the hull is propelled through water. It is a further object to provide a boat hull which produces a minimal wake as the hull is propelled through the water at speeds of about 35 mph. It is still a further object to provide a ski boat which remains stable and maneuverable at high speeds. Further objects and advantages will become apparent through reference to the description and accompanying drawings in which:

FIG. 1 is a perspective view of a boat embodying various of the features of the present invention;

FIG. 2 is a side elevational view of the boat hull which is a part of the boat shown in FIG. 1;

FIG. 3 is a front elevational view of the hull shown in FIG. 2;

FIG. 4 is a bottom view of the hull shown in FIG. 2;

FIG. 9 is a sectional view taken along line 9—9 in FIG. 1.

Figure 5:
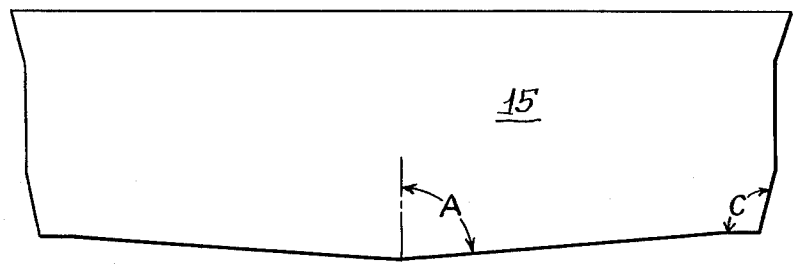
FIG. 5 is a view taken along line 5—5 in FIG. 4.

In accordance with the present disclosure, there is provided a ski boat having a hull which comprises a plurality of connected panels cooperatively defining a wetting surface. The hull includes a keel section comprising a pair of keel panels, extending from a transom forwardly to a location above the water line at a bow, and generally V-shaped in lateral, vertical cross-section. The angle between the keel panels increases from the bow to the stern where the angle is slightly less than 180° at the transom. Chine panels are provided at the marginal edges of the keel panels. The chine panels extend downwardly from the line of connection with the keel panels at an angle of the order of about 35° to the horizontal at the bow and that angle is progressively decreased to an angle of about 0° to the horizontal at the stern. Of course, the hull also includes the usual side panels.

In operation, as the propellor, driven by an inboard engine, urges the boat forwardly through and over the water the V-shaped keel section pushes water outwardly. The water naturally moves upwardly along a path of less resistance. The outwardly and upwardly moving water strikes the chine panels, lifting the hull higher in the water. At the same time, the chines direct the moving water downwardly into the body of water. As the outwardly and upwardly moving water approaches the stern of the hull, where the chine panels approach horizontal positions, the water continues to provide lift for the boat due to the vertical force vector of the water.

I have discovered that the condition of the wake can be further improved by providing an orienting surface between the surface of the transom and the bottom of the hull. This orienting surface is a relatively short surface which extends across the stern of the boat at the transom, the surface being inclined downwardly from the plane of the keel panels and chine panels. The effect of the orienting surface can be further enhanced if the transom is bowed outwardly at least at its lower edge. A suitable amount of outward bow has been found to be of the order of 5 percent of the width of the hull at the stern.

Now referring to the drawings, there is shown a ski boat 11 comprising a hull 13 having a transom 15. The hull is provided with an elongated generally horizontal deck 17. The deck 17 includes a bow 19, a stern edge 21, a starboard edge 23 and a port edge 25. The transom 15, including a deck edge 27, keel edge 29, a starboard edge 31 and a port edge 33, is attached to the deck 17 at the stern edge 21 and extends generally vertically, downwardly therefrom. The remainder of the hull 13 is attached to the deck along the port edge 25 and starboard edge 23 and joined to the transom along the port edge 33, keel edge 29 and starboard edge 31. Thus, the boat is a sealed structure except for a cockpit (not shown) in the deck 17. The boat is preferably formed from molded fiberglass, as it is well known in the art. Commonly, the deck is molded in one piece and the hull and transom are molded as one piece.

It is to be recognized that the deck shown is not critical to the invention, and that any deck of suitable design can be utilized with the disclosed hull. As depicted, the hull 13 is symmetrical about a longitudinal vertical plane. Therefore, only the starboard side will be described in detail, the port side forming a mirror image thereof.

The starboard side of the hull 13 includes a keel panel 35 having a keel edge 37, a stern edge 39, and a starboard edge 41 (FIG. 4). The keel edge 37 is connected to the corresponding port keel panel. The keel edge 37 and the starboard edge 41 are generally parallel in the aft portion of the keel panel 35, which comprises approximately 70 percent of the length of the boat. At the forward end of the keel panel the keel edge 37 and the starboard edge 41 approach one another and meet at the bow of the boat. Of course, the fore and aft portions of the keel panel form a smooth, continuous surface.

Figure 6:
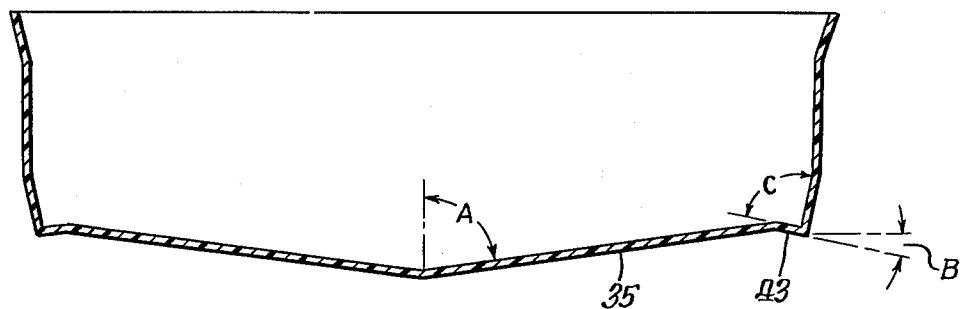
FIG. 6 is a sectional view taken along line 6—6 in FIG. 4.
Figure 7:
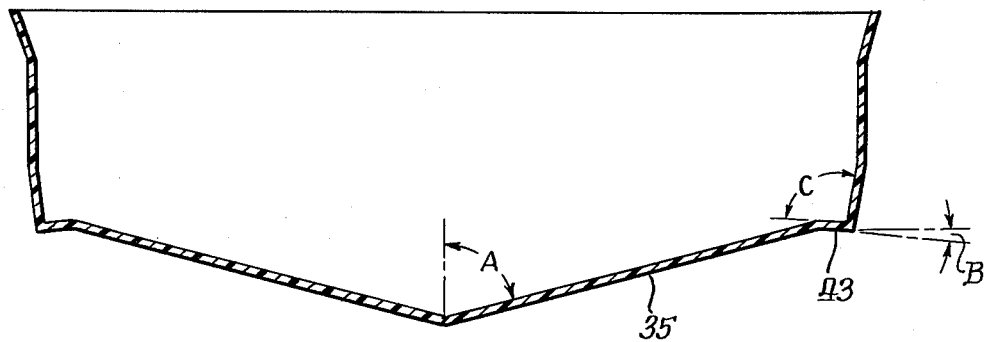
FIG. 7 is a sectional view taken along line 7—7 in FIG. 4.
Figure 8:
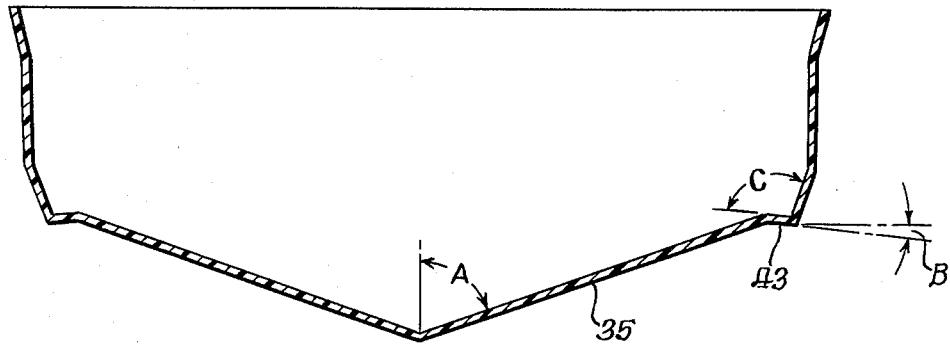
FIG. 8 is a sectional view taken along line 8—8 in FIG. 4.

The keel edge 37 lies in the vertical, longitudinal, centerline plane of the boat. The panel 35 and the longitudinal, vertical, centerline plane, mutually define an angle A therebetween from the transom 15 to the point 42 (FIGS. 2 and 4), a point below and to the aft of the bow 19. The point 42 is above the water line when the boat is cruising at speeds greater than about 15 mph, and the hull slopes upwardly and forwardly from that point to the bow. The angle A progressively increases from an angle of about 50° at point 42 to about 88° at the stern edge 39. FIGS. 5, 6, 7 and 8 depict cross sections of the hull at the points indicated. FIG. 5 is the cross section at the transom; FIG. 6 is a cross section 4 feet forward of the transom; FIG. 7 is a cross section 8 feet forward of the transom; and FIG. 8 is a cross section 11 feet forward of the transom. As pointed out, the angle A at the stern is 88° in a preferred embodiment and in that embodiment the angle A is 82° at 4 feet, 76° at 8 feet, and 70° at 11 feet. (The overall length of the boat is 19 feet.) Thus, the angle between the keel panels is about 176° at the stern and decreases at a rate of about 3° per foot over at least most of the wetting surface.

The inboard edge 45 of a chine panel 43, having an inboard edge 45, outboard edge 47 and stern edge 49, connects with the keel panel 35 along the entire length of the starboard edge 41, to define an angle B. The chime panel 43 progressively expands in width from point 42, its intersection with keel edge 37, to a width of about 5 percent of the width of the transom. This width is maintained over the aft 70 percent of the length of the boat. In an embodiment 19 feet in overall length where the transom width is 63 inches, the maximum width of the chine panel is about 3 inches and remains essentially constant over the aft 70 percent of the length of the chine panel 43.

The angle B progressively deviates downwardly from the horizontal at the stern to an angle of less than about 20° in the wetted portion of the hull under operating conditions. On the out-of-water area at the forward end of the hull the chine panel can be of any design consistent with the appearance of the boat. In the preferred 19 foot embodiment the angle B at the stern (FIG. 5) is 0°; at 4 feet (FIG. 6) 12°; at 8 feet (FIG. 7) 16°; and at 11 feet (FIG. 8) 16°.

The side panel 51, having a wet edge 53, bow edge 55, stern edge 57, and deck edge 59, is connected to the chine panel outboard edge 47 at the wet edge 53, connected to the transom starboard edge 31 at the stern edge 57, and connected to the deck starboard edge 23 at the deck edge 59. The bow edge 55 lies in the vertical, longitudinal, centerline plane as a smooth continuation of the keel edge 37 of the keel panel 35 and forms an angle of about 150° with the deck 13.

The side panel 51 extends generally outwardly and upwardly from the chine panel outboard edge 47 to the deck starboard edge. In the embodiment shown in the drawings, the side panels 51 comprises a lower panel section 61, a middle panel section 63 and an upper panel section 65. The lower panel section 61 having a middle edge 67 and a chine edge 69 extends from the transom to the bow, joining the chine panel 43 to cooperatively define an angle C of about 100°. The width of the lower panel section 61 at the transom is about 8 percent of the transom width. The middle edge 67 is essentially parallel to the deck. The width of the lower panel section diminishes to the point 42 at the intersection with the keel edge 37. The width of the middle wall section 63 at the transom is about 13 percent of the transom width and is generally vertical over the rear 70 percent of its length, then progressively turns to an angle of about 45° with the deck 13 at the bow. The width of the upper section 65 at the transom is about 8 percent of the transom width and generally constant from the transom to the bow. The upper section 65 is generally parallel to the lower section 61 from the transom to the bow. For the purposes of describing a complete embodiment of the boat hull we have described the side panels in detail. Other side panel constructions may be employed.

As shown in exaggerated form in FIG. 9, an orienting panel 71 is provided intermediate the keel edge 29 of the transom 15 and the stern edge 39 of the keel panel 35 and the stern edge 49 of the chine panel 43. As illustrated, the orienting panel 71 provides a downwardly inclined surface of relatively narrow width across the entire bottom of the transom. In a preferred embodiment of a boat having an overall length of 19 feet and width at the transom of 63 inches, the orienting panel 71 is about one inch wide and the angle D (FIG. 9) about 175°. As the orienting panel 71 is disposed entirely below the water surface, it tends to lower the bow of the boat towards the water, increasing the surface area of the hull that frictionally engages the water, i.e., the wetting surface. Also, the area of the chine panel 43 exposed to water pressure is increased.

In order to maximize the effect of the orienting panel 71 it has been found desirable to bow the transom outwardly so that the orienting surface is curved, i.e. is concave to the general direction of water flow due to movement of the boat. The degree of the bow being such that the maximum duration from the chord of the curve is of the order of about 5 percent of the width of the transom. In the 19 foot preferred embodiment, which has been previously discussed, the transom was smoothly curved generally along an arc of a circle, the transom being 63 inches wide and the maximum deviation from a chord of the arc being about 3 inches.

The illustrated boat (FIG. 1) is an inboard boat having a rudder 75, a propeller 77 and three spaced fins 79.

While the exact reasons therefor are not known, a boat constructed in accordance with the preceding description comprises an excellent boat for towing water skiers, particularly in competitions. The features described, both separately and in combination provide a wake pattern which is ideal for competitive skiing. At low speeds of about 18 mph, a wake is produced which comprises a pair of primary waves which are about 20 inches in height at a distance of about 35 feet behind the boat. Each primary wave includes an inside angle of about 20° with the horizontal and an outside angle of about 30° with the horizontal. Such a wave provides a desirable take-off surface, a tool for the trick skier. The water surface between the primary waves at 35 feet is exceptionally smooth, as is preferred for trick skiing, such as spins.

At higher speeds of about 35 mph (used for slalom and jumping) the minimization of turbulence is maintained and the primary waves are diminished in height. The height of the primary waves is about 10 inches at a distance about 75 feet behind the boat.

The turbulence of the water is minimized in the area between the primary waves both because the hull does not trap substantial quantities of air in the water as it travels and the production of secondary waves is suppressed.

In addition, the boat is easily controlled. Even as a skier swings from side to side on a tow rope, the pressures exerted upon the boat do not cause it to weave excessively and allows the driver to closely follow the required course in competition.

Whereas there has been described a specific embodiment of the disclosed hull, it is to be recognized that one skilled in the art could make modifications and/or changes and the scope of the invention is intended to be limited only as set forth in the claims.

What is claimed is:

1. A ski boat for producing a relatively small, well-defined wake and a relatively smooth working table, comprising an elongated hull having a keel section generally V-shaped in cross section, the angle of the "V" increasing towards the stern of the hull, a chine panel at each of the outboard edges of said keel section, said chine panels extending from the forward position of the hull to the stern, each of said chine panels defining an acute angle with the horizontal towards the forward end of the boat which angle decreases to provide a chine panel which is generally horizontal at the stern, a transom at the stern of the hull, said transom being bowed outwardly, an orienting panel of narrow width following the line of said transom, said orienting panel inclining downwardly from said V-shaped keel section and chine panels to said transom.

2. An elongated ski boat for producing a relatively smooth working table comprising an elongated hull including a bow, a stern, port side, starboard side and transom, said hull comprising a starboard keel panel and port keel panel, each of said keel panels having smooth and continuous surfaces, said keel panels extending from a location above the water line near the bow to the stern of said hull and joining one another at a center keel line to form a keel section V-shaped in vertical, lateral cross-section and having a starboard edge and a port edge, said V-shaped keel section defining an obtuse angle at the bow which progressively increases to an angle slightly less than 180° at the stern, a starboard chine panel and a port chine panel, each of said chine panels joining the respective keel section edge, and extending forwardly from the stern to a location above the water line near the bow, each of said chine panels extending downwardly from the line of connection with its associated keel panel, said chine panels being substantially horizontal at the stern and extending downwardly relative to the horizontal at an acute angle which progressively increases towards the bow to an angle of less than about the order of 35°, a starboard side panel and a port side panel connected to and extending upwardly from its associated chine panel, and said transom attached to the starboard and port keel panels, the starboard and port chine panels and the starboard and port side panels at the stern of the hull, wherein the keel panels and chine panels are connected to the transom by an orienting panel, which inclines downwardly from the keel panels and the chine panels to its point of connection with said transom, at least the lower edge of the transom and the orienting panel being bowed outwardly.

3. The boat of claim 2 wherein the degree of bow is such that the maximum deviation from the chord is of the order of 5 percent of the width of the boat at the stern.

4. The boat of claim 3 wherein the orienting panel and the chine panels and keel panels make an angle of about 175°.

* * * * *

UNITED STATES PATENT OFFICE
CERTIFICATE OF CORRECTION

Patent No. 4,263,866      Dated April 28, 1981

Inventor(s) Robert L. Shirley

It is certified that error appears in the above-identified patent and that said Letters Patent are hereby corrected as shown below:

Column 6, line 15, change "position" to -- portion --.

Signed and Sealed this

Thirtieth Day of June 1981

[SEAL]

*Attest:*

RENE D. TEGTMEYER

*Attesting Officer*      *Acting Commissioner of Patents and Trademarks*